United States Patent [19]

Peterson et al.

[11] 4,099,331
[45] Jul. 11, 1978

[54] PLUMB-RULE

[76] Inventors: Wallace W. Peterson, 8243 Highway B, Kewaskum, Wis. 53040; Oscar L. Anderson, 2919 S. 71st St., Milwaukee, Wis. 53219

[21] Appl. No.: 687,296

[22] Filed: May 17, 1976

[51] Int. Cl.$^2$ .............................................. G01C 9/00
[52] U.S. Cl. ............................................ 33/88; 33/374
[58] Field of Search .................. 33/88, 161, 374, 375, 33/376, 342, 295, 296, 143 M, 143 K, 147 R, 147 J, 147 T, 105, 106, 89, 107 R, 85

[56] References Cited

U.S. PATENT DOCUMENTS

| 161,761 | 4/1875 | Crosscup | 33/107 R |
|---|---|---|---|
| 185,977 | 1/1877 | Smith | 33/107 R |
| 684,846 | 10/1901 | Moss | 33/374 |
| 844,536 | 2/1907 | Prindle | 33/143 M |
| 1,015,877 | 1/1912 | Du Mouchel | 33/105 |
| 1,614,139 | 1/1927 | McGowen | 33/161 |
| 1,848,003 | 3/1932 | Chalupny | 33/161 |
| 1,908,496 | 5/1933 | Hunter | 33/85 |
| 2,348,095 | 5/1944 | Roby | 33/88 |
| 2,584,568 | 2/1952 | Frazier | 33/295 |
| 2,627,115 | 2/1953 | Pippin | 33/375 |
| 3,367,032 | 2/1968 | Johnson | 33/143 M |
| 3,492,737 | 2/1970 | Swason | 33/161 |
| 3,522,657 | 8/1970 | Metrulis | 33/88 |
| 3,762,058 | 10/1973 | Heater | 33/161 |
| 3,863,346 | 2/1975 | Quenot | 33/342 |

*Primary Examiner*—Richard E. Aegerter
*Assistant Examiner*—John W. Shepperd
*Attorney, Agent, or Firm*—Andrus, Sceales, Starke & Sawall

[57] ABSTRACT

Two extruded aluminum or plastic channel members facing each other and with one confined within the other provide a plumb-rule of basic length and extendable to nearly double that length. The outer channel contains longitudinally spaced spirit level bubbles, a protractor level, and a bulls-eye level bubble all viewable from the exterior through corresponding openings in the back and side walls of the channel, and located free of interference from the inner channel. A counter is incorporated near the upper end of the outer channel and actuated by the extension movement of the inner channel to indicate the extension in increments of distance.

7 Claims, 11 Drawing Figures

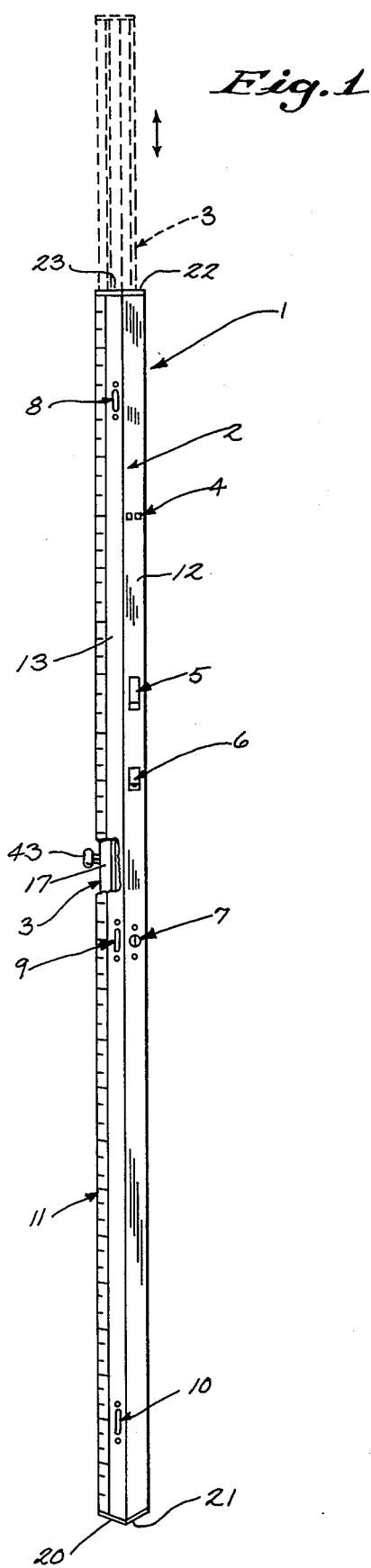
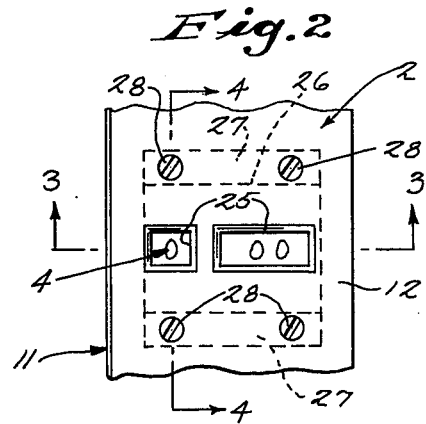
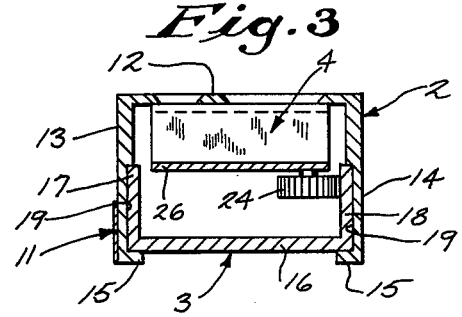
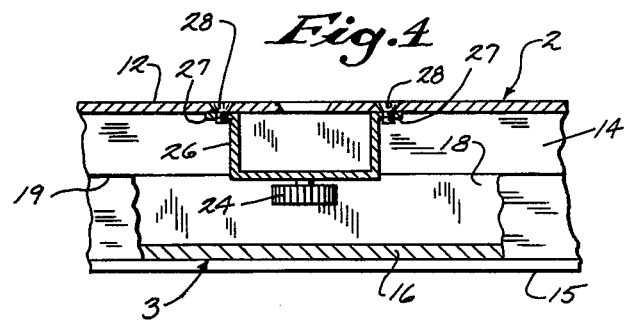
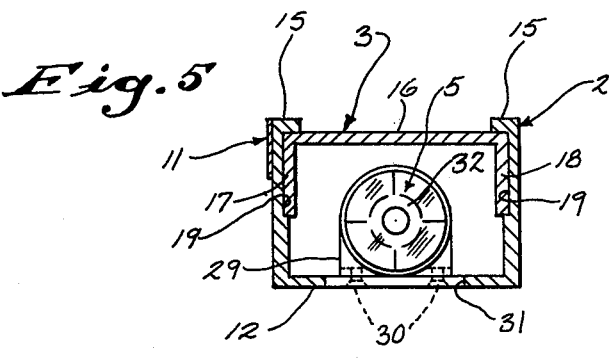

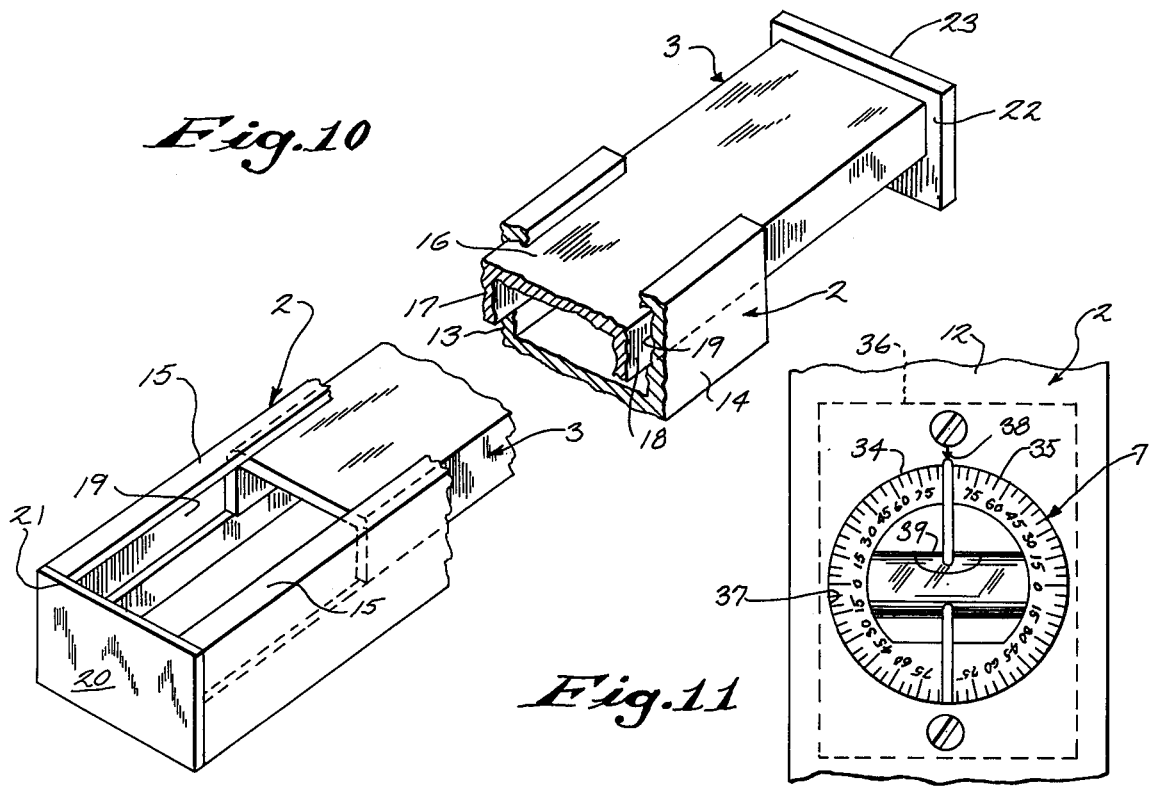

PLUMB-RULE

BACKGROUND OF THE INVENTION

1. Field of the Invention

This invention relates to a plumb-rule which extends to measure vertical heights or horizontal and angular distances, with spirit levels determining the positioning of the rule.

2. Description of the Prior Art

Heretofore plumb-rules have been either of very complicated intricate and expensive telescoping members or of mere wooden strips slidably held together and generally of short life.

The mounting of spirit levels and other desirable measuring or indicating instruments without exposure to injury during handling and use of the plumb-rules has presented a problem with most telescoping construction.

SUMMARY OF THE INVENTION

The plumb-rule of the present invention is of hollow tubular construction in which two extruded metal or plastic channel members face each other so that the back of one member closes the open side of the other member.

The sides of the inner channel member slide in corresponding recesses in the opposite sides of the outer channel member to interlock the two members together and at the same time provide for relative longitudinal telescopic movement therebetween.

The depth of the outer channel is substantially greater than the depth of the inner channel to provide the necessary space and attachment facility for the several spirit level bubbles and other instruments in the outer channel without interference with telescoping of said inner channel while providing a minimum of exposure for the inner channel.

Spirit level bubbles are provided at several locations spaced longitudinally of and inside the outer channel with corresponding viewing openings in a wall of the channel to indicate when the plumb-rule is disposed horizontally.

A protractor level bubble is mounted inside the outer channel with an opening through the back side of the channel for viewing and with exterior means for adjusting the bubble for indication of various predetermined angular positions for the plumb-rule.

A bulls-eye level bubble is also mounted inside the outer channel with an opening through the back side of the channel for viewing the same to indicate when the plumb-rule is disposed vertically.

A counter is disposed within the plumb-rule with an opening through the back side of the outer channel at a suitable distance from the foot of the rule, and which is actuated by relative extension movement between the two channels to indicate the distance which the inner channel extends from the outer channel. Such indications are preferably in feet, inches and fractions of an inch.

A convenient rule inscribed in feet and inches may be secured along one outer corner of the outer channel member for its full length.

An end closure member is secured in the outer channel and may extend outwardly therefrom to provide a foot support for the outer channel member on the floor at the bottom end of the plumb-rule. Similarly, the upper end of the inner channel member may carry a closure member which extends like a flange outwardly of the plumb-rule to provide a marker edge in vertical alignment with the marker edge of the lower foot.

BRIEF DESCRIPTION OF THE DRAWING

The accompanying drawings illustrate the best mode presently contemplated for carrying out the invention.

In the drawings:

FIG. 1 is a perspective view of the plumb-rule;

FIG. 2 is a front view of a portion of the plumb-rule showing the view of the counter;

FIG. 3 is a detail transverse section taken on line 3—3 of FIG. 2;

FIG. 4 is a detail vertical section taken on line 4—4 of FIG. 2;

FIG. 5 is a detail transverse section looking down upon the bulls-eye bubble and its mounting;

FIG. 6 is a front view of a portion of the plumb-rule showing the spirit level bubble for determining the vertical positioning of the plumb-rule in one plane;

FIG. 7 is a detail transverse section taken on line 7—7 of FIG. 6;

FIG. 8 is a side view of a portion of the plumb-rule showing one of the spirit level bubbles for horizontal leveling of the plumb-rule;

FIG. 9 is a detail transverse section taken on line 9—9 of FIG. 8;

FIG. 10 is a combination perspective and diagrammatic view showing the foot and upper crown closures with the cooperating marker edges; and FIG. 11 is a front elevation of a portion of the plumb-rule showing the protractor spirit level.

DESCRIPTION OF THE PREFERRED EMBODIMENT

The plumb-rule 1 illustrated in the drawings comprises, in general, two structural type aluminum extrusions of channel shape 2 and 3, with a measurement reader or counter 4, a bulls-eye spirit level 5, a spirit level 6, a protractor spirit level 7, a series of horizontal spirit levels 8, 9 and 10, and a linear rule 11.

The outer channel member 2 is substantially square in cross section, with a bottom or front face 12 and two sides 13 and 14 disposed at right angles to the face 12. The free edges of sides 13 and 14 are flanged inwardly toward each other to provide the corresponding edge members 15 adapted to overlie and retain the inner channel 3.

The inner channel 3 has a bottom 16 and two sides 17 and 18 disposed at right angles to the bottom 16. The sides 17 and 18 of channel 3 slide in corresponding recesses 19 in the sides 13 and 14 of channel 2 with the bottom 16 closing the channel 2 just beneath the edge members 15 which serve to retain channel 3 within channel 2.

The recesses 19 and channel sides 17 and 18 slidable therein are substantially shorter than the full width of sides 13 and 14 so that only approximately one half the cross sectional area within the plumb-rule is within channel 3 and the remaining one-half of the area is within channel 2 and free from channel 3.

The lower end of channel 2 is closed by a foot plate 20 suitably secured thereto and extending beyond the face 12 to provide a marker edge 21.

The upper end of channel 3 is closed by a plate 22 which extends over the face 12 of channel 2 to provide a marker edge 23 in vertical alignment with marker edge 21 when the plumb-rule is disposed vertically as indicated by the bulls-eye spirit level 5.

The counter 4 is of the type used commercially in measuring lengths of cloth and other materials from bolts and the like, wherein a wheel 24 engages the inside of channel 3 and is rotated in response to movement of channel 3 in extending from channel 2. The wheel 24 drives counter mechanism which displays the amount of movement of channel 3 in numerical figures displayed for observation by an attendant through the window 25 in the face of channel 2. The numerical figures are in terms of feet and inches and may be in any desired increments of measurement.

Assuming that channel 2 is approximately 6 feet in length and that channel 3 can extend upwardly from one end of channel 2 as much as 5 feet, the counter may read in terms of sixty inches and will register accurately the height of a ceiling that may be anywhere from 6 feet to 11 feet from the floor. If a 12 foot ceiling is to be measured an extension (not shown) of 1 foot in length, or other given length may be removably clipped to plate 22.

The counter 4 is suitably secured in channel 2 in a position which does not interfere with the sliding movement of channel 3 within channel 2. For this purpose the counter 4 is carried by a channel shaped bracket 26 which has end flanges 27 engaging and secured to the inside of face 12 by screws 28.

The bulls-eye spirit level 5 is carried by an angle bracket support 29 with screws 30 fastening the vertical flange of the support to the inside of face 12. A relatively large window or opening 31 through face 12 just above the level 5 provides access for reading of the level.

The bulls-eye spirit level is generally in pancake form with the upper circular horizontal face provided with indicia for reading when the universal air bubble 32 of the unit registers in a central position, thus indicating that the channel 2 is vertical in all planes.

The spirit level 6 is generally cylindrical and disposed transversely behind face 12 with an opening or window in face 12 registering therewith to provide for observance of the indicator bubble in the cylinder. When the indicator bubble is centered properly within the tubular housing or vial 33 of spirit level 6 the channel 2 will be vertical in a plane containing the axis of the housing.

The protractor spirit level 7 comprises a cylindrical housing 34 mounted on a rotatable dial 35 carried by a bracket 36 behind face 12. The face 12 has a circular opening 37 therein registering with the dial 35.

The dial 35 carries suitable angular degree marks thereon and may be rotated to register any desired degree with a fixed vertical mark 38 on face 12, so that by adjusting the level to a given angle it is possible to utilize the bubble 39 in housing 34 to indicate when the channel 2 is disposed at the given angle.

The counter 4 and the several spirit levels 5, 6 and 7 are located at heights providing for ready observation thereof by an attendant standing beside the plumb-rule and manipulating it. All of them are mounted in channel 2 behind face 12 in a region free of interference with movement of channel 3, except for the spring pressed counter wheel 24 which engages the inside surface of channel 3 to register its extension from channel 2.

When it is desired to employ the plumb-rule 1 horizontally three additional spirit levels 40 are provided, one near each end of channel 2 and the other centrally of channel 2. These spirit levels 40 are constructed of tubular housings 41 disposed longitudinally of channel 2 behind side 13 thereof in the region between the edge of side 17 of channel 3 and the face 12 on channel 2. Suitable windows or openings 42 are disposed through side 13 in register with the corresponding spirit levels 40 to facilitate observation of the latter.

In addition, a 6 foot or other linear rule 42 is secured to channel 2 at one longitudinal corner.

The plumb-rule 1 described above and illustrated in the drawings is of basically simple construction in which the two channels may be separated readily to provide access to the counter and the several spirit levels for repair and replacement purposes.

A knob 43 on the outer face of channel 3 is disposed to facilitate manual extension of channel 3 relative to channel 2.

Various modes of carrying out the invention are contemplated as being within the scope of the following claims particularly pointing out and distinctly claiming the subject matter which is regarded as the invention.

I claim:

1. A plumb-rule comprising a pair of inner and outer channel members telescopically related in face to face arrangement with the back of the inner channel member closing the open side of said outer channel member, said members having their adjacent sides interlocked to prevent lateral displacement of said inner member from said outer member, spirit level means within said outer member free of interference with the inner member, a bracket secured to said outer member and carrying said spirit level means, and window means in the face of said outer member registering with said spirit level means for ready observance thereof the outer end of the inner channel member having means aligned with a surface of said outer member for determining the position of the plumb rule in accordance with the indication of said spirit level means.

2. The plumb-rule of claim 1 and counter means within said outer member, a bracket secured to said outer member and carrying said counter means, said counter means having drive means contacting with said inner member and operable by relative telescopic movement of said members to indicate the linear extension of said inner member from said outer member, and window means in said outer member adjacent said counter means for observance thereof.

3. The plumb-rule of claim 1 in which said spirit level means comprises a bulls-eye level to facilitate vertical positioning of the plumb-rule in all planes containing the axis of the level.

4. The plumb-rule of claim 1 in which said spirit level means comprises a horizontal tubular sealed vial with a spirit bubble therein disposed transversely behind a face of said outer member.

5. The plumb-rule of claim 1 in which said spirit level means comprises a protractor mounted spirit level unit having a manually rotatable dial carrying the spirit level, and protractor means associated with said dial to indicate angular positioning of said plumb-rule as related to the vertical.

6. The plumb-rule of claim 1, a marker edge disposed at the foot of said outer member, and a marker edge disposed at the upper end of said inner member, said marker edges being in line vertically when said plumb-rule is positioned vertically.

7. The plumb-rule of claim 1 and a plurality of spirit levels having tubular vials disposed longitudinally within said outer member and spaced longitudinally thereof to establish a horizontal positioning of the plumb-rule, with window means in said outer member for reading of the corresponding spirit levels.

* * * * *